US010028131B2

(12) United States Patent
Christopher et al.

(10) Patent No.: US 10,028,131 B2
(45) Date of Patent: Jul. 17, 2018

(54) APPARATUS AND METHODS FOR DISTRIBUTING CREDENTIALS OF MOBILE NETWORK OPERATORS

(71) Applicant: AT&T MOBILITY II LLC, Atlanta, GA (US)

(72) Inventors: David A. Christopher, Atlanta, GA (US); Dana Tardelli, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 15/266,540

(22) Filed: Sep. 15, 2016

(65) Prior Publication Data
US 2017/0006467 A1    Jan. 5, 2017

Related U.S. Application Data

(63) Continuation of application No. 13/526,696, filed on Jun. 19, 2012, now Pat. No. 9,473,929.

(51) Int. Cl.
*H04W 8/20* (2009.01)
*H04W 48/18* (2009.01)

(52) U.S. Cl.
CPC ......... *H04W 8/205* (2013.01); *H04W 48/18* (2013.01)

(58) Field of Classification Search
CPC ....... H04W 12/06; H04W 8/205; H04W 8/20; H04W 8/265; H04W 8/18; H04B 1/3816
See application file for complete search history.

(56) References Cited

U.S. PATENT DOCUMENTS

| 5,943,619 | A  | 8/1999  | Coyne et al. |
| 6,157,378 | A  | 12/2000 | Bormann et al. |
| 8,171,525 | B1 | 5/2012  | Pelly et al. |
| 8,396,011 | B2 | 3/2013  | Carolan et al. |
| 8,412,933 | B1 | 4/2013  | Pelly et al. |

(Continued)

FOREIGN PATENT DOCUMENTS

WO    2012076464 A1    6/2012

OTHER PUBLICATIONS

GSMA, "Embedded SIM Task Force Requirements and Use Cases", Feb. 21, 2011.

(Continued)

*Primary Examiner* — Thai Vu
(74) *Attorney, Agent, or Firm* — Guntin & Gust, PLC; Robert Gingher

(57) ABSTRACT

A system that incorporates teachings of the subject disclosure may include, for example, a method for detecting, by a first device including a least one processor and a first Universal Integrated Circuit Card (UICC), a second device having a second UICC, detecting, by the first device, that the second UICC is unprovisioned, selecting, by the first device, one of a plurality of selectable options, where the selection identifies a first Mobile Network Operator (MNO) selected from a plurality of MNOs, receiving, by the first device, first credential information of the first MNO, and transmitting, by the first device, to the second device the first credential information for enabling the second device to facilitate establishment of communication services with network equipment of the first MNO according to the first credential information. Other embodiments are disclosed.

20 Claims, 11 Drawing Sheets

(56) References Cited

U.S. PATENT DOCUMENTS

| | | | |
|---|---|---|---|
| 8,429,409 B1 | 4/2013 | Wall et al. | |
| 8,554,175 B2 | 10/2013 | Pecen et al. | |
| 8,724,625 B2 | 5/2014 | Carolan et al. | |
| 8,800,015 B2 | 8/2014 | Tardelli et al. | |
| 8,843,179 B2 | 9/2014 | Li et al. | |
| 2003/0153135 A1 | 8/2003 | Kim et al. | |
| 2004/0042442 A1 | 3/2004 | Pecen et al. | |
| 2004/0236702 A1 | 11/2004 | Fink et al. | |
| 2004/0240450 A1 | 12/2004 | Turcanu et al. | |
| 2005/0021875 A1 | 1/2005 | Bouthemy et al. | |
| 2005/0273499 A1 | 12/2005 | Goodman et al. | |
| 2006/0020692 A1 | 1/2006 | Jaffray et al. | |
| 2006/0153135 A1 | 7/2006 | Ascolese et al. | |
| 2006/0205434 A1 | 9/2006 | Tom et al. | |
| 2006/0235796 A1 | 10/2006 | Johnson et al. | |
| 2007/0011704 A1 | 1/2007 | Anglin | |
| 2007/0180488 A1 | 8/2007 | Walter | |
| 2007/0234397 A1 | 10/2007 | Pearson | |
| 2008/0146223 A1 | 6/2008 | Welnick et al. | |
| 2008/0148336 A1 | 6/2008 | Walter | |
| 2008/0261561 A1 | 10/2008 | Gehrmann | |
| 2009/0077643 A1 | 3/2009 | Schmidt | |
| 2009/0158344 A1 | 6/2009 | Anglin, Jr. | |
| 2009/0209232 A1 | 8/2009 | Cha | |
| 2009/0215431 A1 | 8/2009 | Koraichi | |
| 2009/0282251 A1 | 11/2009 | Cook et al. | |
| 2010/0048255 A1 | 2/2010 | Jojivet et al. | |
| 2010/0138856 A1 | 6/2010 | Anglin, Jr. | |
| 2010/0190475 A1 | 7/2010 | El-Kadri et al. | |
| 2010/0255819 A1 | 10/2010 | Robles | |
| 2010/0313251 A1 | 12/2010 | Carolan et al. | |
| 2011/0088028 A1 | 4/2011 | Tofighbakhsh et al. | |
| 2011/0092253 A1 | 4/2011 | Amiel | |
| 2011/0202641 A1 | 8/2011 | Kahn et al. | |
| 2011/0246978 A1 | 10/2011 | Alfano et al. | |
| 2011/0256896 A1 | 10/2011 | Giaretta et al. | |
| 2011/0314287 A1 | 12/2011 | Escott et al. | |
| 2011/0320579 A1 | 12/2011 | Takeuchi | |
| 2012/0072979 A1 | 3/2012 | Cha | |
| 2012/0108295 A1 | 5/2012 | Schell et al. | |
| 2012/0129500 A1 | 5/2012 | Rajadurai et al. | |
| 2012/0190354 A1 | 7/2012 | Merrien et al. | |
| 2012/0282891 A1* | 11/2012 | Mohammed | H04L 63/0428 455/406 |
| 2012/0304254 A1 | 11/2012 | Musfeldt et al. | |
| 2012/0304255 A1 | 11/2012 | Carnes | |
| 2012/0311064 A1 | 12/2012 | Deo | |
| 2013/0012185 A1 | 1/2013 | Lavi et al. | |
| 2013/0065551 A1 | 3/2013 | Raleigh et al. | |
| 2013/0078949 A1 | 3/2013 | Pecen et al. | |
| 2013/0097682 A1 | 4/2013 | Zeljkovic et al. | |
| 2013/0117805 A1 | 5/2013 | Kent et al. | |
| 2013/0138959 A1 | 5/2013 | Pelly et al. | |
| 2013/0165075 A1* | 6/2013 | Rishy-Maharaj | H04W 12/04 455/411 |
| 2013/0183932 A1 | 7/2013 | Lemilainen et al. | |
| 2013/0198822 A1 | 8/2013 | Hitchcock et al. | |
| 2013/0205360 A1 | 8/2013 | Novak et al. | |
| 2013/0212384 A1 | 8/2013 | Pelly et al. | |
| 2013/0225123 A1 | 8/2013 | Adjakple et al. | |
| 2013/0226627 A1 | 8/2013 | Kubovcik et al. | |
| 2013/0231087 A1 | 9/2013 | O'Leary | |
| 2013/0247163 A1 | 9/2013 | Ganem | |
| 2013/0267199 A1 | 10/2013 | Kamal et al. | |
| 2013/0273889 A1 | 10/2013 | Lobmaier | |
| 2013/0273911 A1 | 10/2013 | Mohammed et al. | |
| 2013/0310001 A1 | 11/2013 | Midkiff et al. | |
| 2013/0329683 A1 | 12/2013 | Berard et al. | |
| 2013/0337803 A1 | 12/2013 | Christopher et al. | |
| 2013/0340059 A1 | 12/2013 | Christopher et al. | |
| 2014/0019760 A1 | 1/2014 | Vergnes et al. | |
| 2014/0295830 A1 | 10/2014 | Oerton | |
| 2016/0366018 A1 | 12/2016 | Smith | |
| 2017/0006466 A1 | 1/2017 | Midkiff | |
| 2017/0118628 A1 | 4/2017 | Christopher et al. | |

OTHER PUBLICATIONS

Paterno, Giuseppe, "Enhanced SIM (ESIM): a proposal for mobile security", Centre for Telecommunications Value-Chain Research, Trinity College Dublin, Sep. 2009, 4 pages.

\* cited by examiner

100

APPARATUS AND METHODS FOR DISTRIBUTING CREDENTIALS OF MOBILE NETWORK OPERATORS

CROSS-REFERENCE TO RELATED APPLICATION

This application is a continuation of and claims priority to U.S. patent application Ser. No. 13/526,696 filed Jun. 19, 2012 by Christopher et al., entitled "Apparatus and Methods for Distributing Credentials of Mobile Network Operators." All sections of the aforementioned application is incorporated herein by reference in its entirety.

FIELD OF THE DISCLOSURE

The subject disclosure relates generally to an apparatus and methods for distributing credentials of mobile network operators.

BACKGROUND

Mobile Network Operators (MNOs) generally provide each subscriber a Universal Integrated Circuit Card (UICC), commonly known as a Subscriber Identity Module or SIM card, which enables authentication and access to a mobile network and provides identifiers that allow equipment of the MNO to account for service usage and to bill the subscriber accordingly. The SIM card is removable by the subscriber and can be inserted in any compatible device, providing continuity of network access service from device to device. A user can switch to another MNO by physically swapping SIM cards in their device.

In an environment involving machine-to-machine communications, it is common for a UICC to be placed in harsh environments such as a communication device located in an automobile engine, or atop a streetlight, which is not easily accessible. In such applications the UICC is often embedded in the communication device and not physically replaceable. When a subscriber of a device utilizing an embedded UICC wishes to switch to another MNO, the subscriber may have to replace the device if the embedded UICC is not configured to be re-provisioned.

BRIEF DESCRIPTION OF THE DRAWINGS

Reference will now be made to the accompanying drawings, which are not necessarily drawn to scale, and wherein.

DETAILED DESCRIPTION

Figure 1:
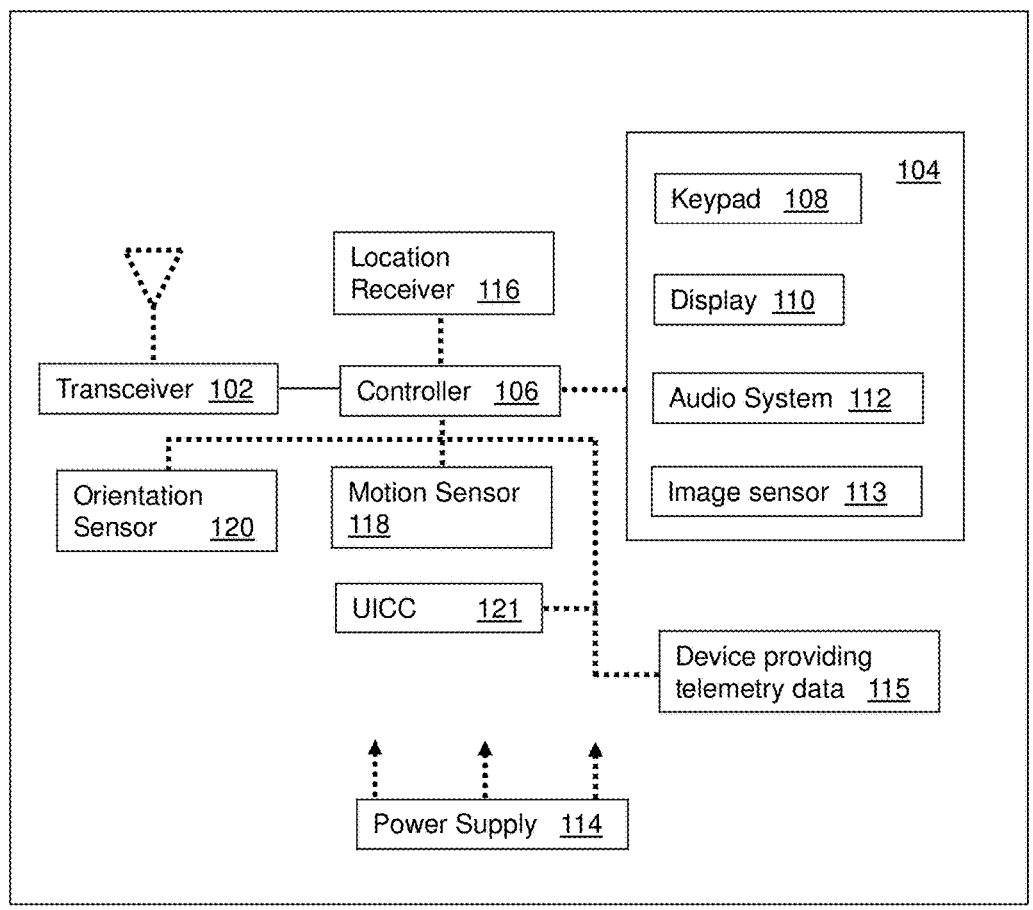
FIG. 1 depicts an illustrative embodiment of a communication device.

The subject disclosure describes, among other things, illustrative embodiments for distributing credentials of mobile network operators. Other embodiments are contemplated by the subject disclosure.

One embodiment of the subject disclosure includes computer-readable storage medium including computer instructions which, responsive to being executed by at least one processor, cause the at least one processor to perform operations including receiving, by equipment of a first MNO, a request initiated by a first portable communication device for selecting one or more services provided by at least one of a plurality of MNOs, transmitting, by the equipment of the first MNO, information for presenting at a user interface of the first portable communication device a plurality of selectable options for selecting the one or more services from the plurality of MNOs, and detecting, by the equipment of the first MNO, a selection from the plurality of selectable options, where the selection identifies a second MNO selected from the plurality of MNOs. Responsive to executing the computer instructions the at least one processor can also perform operations including receiving, by the equipment of the first MNO, credential information of the second MNO, and transmitting, by the equipment of the first MNO, to the first portable communication device the credential information of the second MNO.

One embodiment of the subject disclosure includes a method for facilitating, by a system including at least one processor, establishment of communications with a source mobile communication device, receiving, by the system, credentials of a plurality of mobile network operators, and transmitting, by the system, to the source communication device the credentials of the plurality of mobile network operators for enabling the source mobile communication device to distribute credentials of one or more mobile network operators of the plurality of mobile network operators to recipient communication devices each including a universal integrated circuit card.

One embodiment of the subject disclosure includes a method for receiving, by a system including at least one processor, a request initiated by a first communication device for selecting one or more services provided by at least one of a plurality of network operators, transmitting, by the system, information for presenting at a user interface of the first communication device a plurality of selectable options for selecting the one or more services from the plurality of network operators, detecting, by the system, a selection from the plurality of selectable options, wherein the selection identifies a first network operator selected from the plurality of network operators, receiving, by the system, credential information of the first network operator, and transmitting, by the system, to the first communication device the credential information of the first network operator.

One embodiment of the subject disclosure includes a first communication device including a memory storing computer instructions, and a processor coupled to the memory. The processor responsive to executing the computer instructions can perform operations including detecting a second communication device with an unprovisioned UICC, presenting at a user interface of the first communication device a plurality of selectable options for selecting one or more services provided by one of a plurality of MNOs, detecting a selection from the plurality of selectable options, wherein the selection identifies a first MNO selected from the plurality of MNOs, receiving first credential information of the first MNO, and transmitting to the second communication device the first credential information for storage in the UICC of the second communication device and for enabling the second communication device to facilitate establishment of communication services with network equipment of the first MNO according to the first credential information.

One embodiment of the subject disclosure includes a method for detecting, by a first device including a least one processor and a first UICC, a second device having a second UICC, detecting, by the first device, that the second UICC is unprovisioned, selecting, by the first device, one of a plurality of selectable options, wherein the selection identifies a first network operator selected from a plurality of network operators, receiving, by the first device, first credential information of the first network operator, and transmitting, by the first device, to the second device the first credential information for enabling the second device to facilitate establishment of communication services with network equipment of the first network operator according to the first credential information.

One embodiment of the subject disclosure includes a computer-readable storage medium, including computer instructions which, responsive to being executed by at least one processor, cause the at least one processor to perform operations including facilitating, by a first portable device, establishment of a peer-to-peer communication session with a second portable device with a second integrated circuit card, selecting, by the first portable device, one of a plurality of selectable options, where the selection identifies a first network operator selected from a plurality of network operators, identifying, by the first portable device, first credential information of the first network operator, and transmitting, by the first portable device first, to the second device the first credential information for storage in the second integrated circuit card and for enabling the second device to facilitate establishment of communication services with network equipment of the first network operator according to the first credential information.

One embodiment of the subject disclosure includes a method for facilitating, by a recipient device including at least one processor and a UICC, establishment of a peer-to-peer communication session with a source device, notifying, by the recipient device, the source device of a provisioning state of the UICC, and receiving, by the recipient device, from the source device first credential information of a first MNO selected by the source device from a plurality of MNOs according to the provisioning state of the UICC. In one embodiment, the source device and recipient device can be portable communication devices. In another embodiment, the peer-to-peer communication session can be a personal area network. In yet another embodiment, the source device can be configured to store credentials of the plurality of MNOs enabling the first device to distribute credentials of one or more MNOs of the plurality of MNOs to UICCs of recipient devices. In another embodiment, the source device can be configured to receive the first credential from one of equipment of one of the plurality of MNOs, equipment of a vendor of communication devices, or equipment of a manufacturer of at least a portion of the communication devices.

One embodiment of the subject disclosure includes a Universal Integrated Circuit Card (UICC) including a memory storing computer instructions, and processor coupled to the memory. The processor responsive to executing the computer instructions can perform operations including retrieving from the memory first credential information for initiating MNO selection services by way of a default MNO, facilitating establishment of communication services with network equipment of the default MNO according to the first credential information, initiating a communication session with service equipment by way of the network equipment of the default MNO, presenting at a user interface of a device coupled to the UICC a plurality of selectable options for selecting one of a plurality of MNOs from which to receive communication services, detecting a selection from the plurality of selectable options, wherein the selection identifies a first MNO selected from the plurality of MNOs, transmitting to the service equipment information descriptive of the selection of the first MNO, receiving from the service equipment second credential information, and facilitating establishment of communication services with network equipment of the first MNO according to the second credential information.

One embodiment of the subject disclosure includes a computer-readable storage medium including computer instructions which, responsive to being executed by at least one processor of a UICC, cause the at least one processor to perform operations including identifying first credential information associated with a default MNO, facilitating establishment of communication services with network equipment of the default MNO according to the first credential information, initiating a communication session with service equipment by way of the network equipment of the default MNO, receiving from the service equipment second credential information associated with a first MNO selected by equipment of a commercial enterprise, and facilitating establishment of communication services with network equipment of the first MNO according to the second credential information.

One embodiment of the subject disclosure includes a method for facilitating, by a system including at least one processor, establishment of a communication session with a device coupled to a Universal Integrated Circuit Card (UICC) by way of network equipment of a default Mobile Network Operator (MNO), receiving, by the system, information descriptive of an MNO selection, selecting, by the system, from a database of credentials of a plurality of MNOs first credential information according to the received information, where the first credential information is associated with a first MNO of the plurality of MNOs, and transmitting, by the system, the first credential information to the UICC over the communication session by way of the device to cause the UICC to facilitate establishment of communications with network equipment of the first MNO according to the first credential information.

One embodiment of the subject disclosure includes a UICC having a memory storing computer instructions, and a processor coupled to the memory. The processor responsive to executing the computer instructions can perform operations including storing parametric information descriptive of operational features of a plurality of software applications executable by the UICC or a device communicatively coupled to the UICC, where the plurality of software applications when executed makes use of services provided by equipment of a first MNO. When executing the computer instructions, the processor can also perform operations including detecting an event indicating that the plurality of software applications are to utilize services provided by equipment of a second MNO, transmitting to the equipment of the second MNO the parametric information descriptive of the operational features of the plurality of software applications to configure the services provided by the equipment of the second MNO to interoperate with the plurality of software applications when executed, and causing or enabling execution of a first software application of the plurality of software applications to interact with at least one of the configured services provided by the equipment of the second MNO.

One embodiment of the subject disclosure includes a computer-readable storage medium including computer instructions which, responsive to being executed by at least one processor of a UICC, cause the at least one processor to perform operations including storing parametric information descriptive of operational features of a plurality of software applications, where the plurality of software applications when executed makes use of services provided by equipment of a first MNO. When executing the computer instructions, the at least one processor can also perform operations including detecting an event indicating that the plurality of software applications are to utilize services provided by equipment of a second MNO, and transmitting to the equipment of the second MNO the parametric information descriptive of the operational features of the plurality of software applications to configure the services provided by the equipment of the second MNO to interoperate with the plurality of software applications.

One embodiment of the subject disclosure includes a method for storing, by a Universal Integrated Circuit Card (UICC) including at least one processor, parametric information descriptive of operational features of a plurality of software applications, where the plurality of software applications when executed makes use of services provided by equipment of a first MNO. The method can further include detecting, by the UICC, an event indicating that the plurality of software applications are to utilize services provided by equipment of a second MNO, and causing, by the UICC, a transmission of the parametric information descriptive of the operational features of the plurality of software applications to the equipment of the second MNO.

FIG. 1 depicts an illustrative embodiment of a communication device 100. The communication device 100 can represent a number of possible device types such as, for example, a cellular telephone, a personal digital assistance, a smart phone, a tablet, a portable computer such as a laptop, an industrial device for providing telemetry information to a central station for monitoring, diagnostics, mitigation or other suitable functions. Multiple variants of the communication device 100 are thus contemplated by the subject disclosure.

The communication device 100 can comprise a wireline and/or wireless transceiver 102 (herein transceiver 102), a user interface (UI) 104, a power supply 114, a location receiver 116, a motion sensor 118, an orientation sensor 120, a UICC 121, and a controller 106 for interacting with or managing operations thereof. The transceiver 102 can support short-range or long-range wireless access technologies such as Bluetooth, ZigBee, WiFi, Digital Enhanced Cordless Telecommunications (DECT), or cellular communication technologies, just to mention a few. Cellular technologies can include, for example, CDMA-1x, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 102 can also be adapted to support circuit-switched wireline access technologies (such as Public Switched Telephone Network or PSTN), packet-switched wireline access technologies (such as TCP/IP, VoIP, IP Multimedia Subsystems or IMS, etc.), and combinations thereof.

The UI 104 can include a depressible or touch-sensitive keypad 108 with a navigation mechanism such as a roller ball, a joystick, a mouse, or a navigation disk for manipulating operations of the communication device 100. The keypad 108 can be an integral part of a housing assembly of the communication device 100 or an independent device communicatively coupled thereto by a tethered wireline interface (such as a USB cable) or a wireless interface supporting for example Bluetooth. The keypad 108 can represent a numeric keypad commonly used by phones, and/or a QWERTY keypad with alphanumeric keys.

The UI 104 can further include a display 110 such as monochrome or color LCD (Liquid Crystal Display), OLED (Organic Light Emitting Diode) or other suitable display technology for conveying images to an end user of the communication device 100. In an embodiment where the display 110 is touch-sensitive, a portion or all of the keypad 108 can be presented by way of the display 110 with navigation features. The display 110 can be an integral part of the housing assembly of the communication device 100 or an independent device communicatively coupled to the communication device 100 by a tethered wireline interface (such as a cable) or a wireless interface.

The UI 104 can also include an audio system 112 that utilizes common audio technology for conveying low volume audio (such as audio heard only in the proximity of a human ear) and high volume audio (such as speakerphone for hands free operation). The audio system 112 can further include a microphone for receiving audible signals of an end user. The audio system 112 can also be used for voice recognition applications. The UI 104 can further include an image sensor 113 such as a charged coupled device (CCD) camera for capturing still or moving images.

The power supply 114 can utilize common power management technologies such as replaceable and rechargeable batteries, supply regulation technologies, and/or charging system technologies for supplying energy to the components of the communication device 100 to facilitate long-range or short-range portable applications. Alternatively, the charging system can utilize external power sources such as DC power supplied over a physical interface such as a USB port or other suitable tethering technologies.

The location receiver 116 can utilize location technology such as a global positioning system (GPS) receiver capable of assisted GPS for identifying a location of the communication device 100 based on signals generated by a constellation of GPS satellites, which can be used for facilitating location services such as navigation. The motion sensor 118 can utilize motion sensing technology such as an accelerometer, a gyroscope, or other suitable motion sensing technology to detect motion of the communication device 100 in three-dimensional space. The orientation sensor 120 can utilize orientation sensing technology such as a magnetometer to detect the orientation of the communication device 100 (north, south, west, and east, as well as combined orientations in degrees, minutes, or other suitable orientation metrics).

The UICC 121 can be utilized for storing data to enable the communication device 100 to, among other things, establish communications with a communication network such as a cellular base station, support enablement of software applications stored in the UICC or a memory of the communication device 100 that makes use of services provided by the communication network. The data stored in the UICC 121 can include, for example, an International Mobile Subscriber Identity (IMSI), a personal phone book, executable software applications purchased by the subscriber, a mapping of services between the software applications and services of a communication network, MNO policy files, and other information as will be described below.

Depending on the communication protocol or the applicable use of the UICC 121, the UICC 121 can be referred to as a subscriber identity module (SIM), a Removable User Identity Module (RUIM), an embedded UICC (eUICC), an embedded SIM (eSIM), and so on. An eUICC or eSIM can represent UICC devices that are integrated by soldering the device onto a printed circuit board of the communication device 100, by attaching the device to a housing assembly of the communication 100, or by software integration of the UICC functions in an existing processor of the communication device 100. Present and next generation physical and operational variants of the UICC 121 are contemplated by the present disclosure.

The controller 106 can utilize computing technologies such as a microprocessor, a digital signal processor (DSP), and/or a video processor with associated storage memory such as Flash, ROM, RAM, SRAM, DRAM or other storage technologies for executing computer instructions, controlling, and processing data supplied by the aforementioned components of the communication device 100.

The controller 106 can be communicatively coupled to a device 115 that can supply telemetry data (e.g., an automobile, a utility meter, etc). In one embodiment, the communication device 100 can be an integral part of the device 115. In another embodiment, the communication device 100 can be co-located and communicatively coupled to the device 115 by way of a physical or wireless communication interface.

Figure 2:
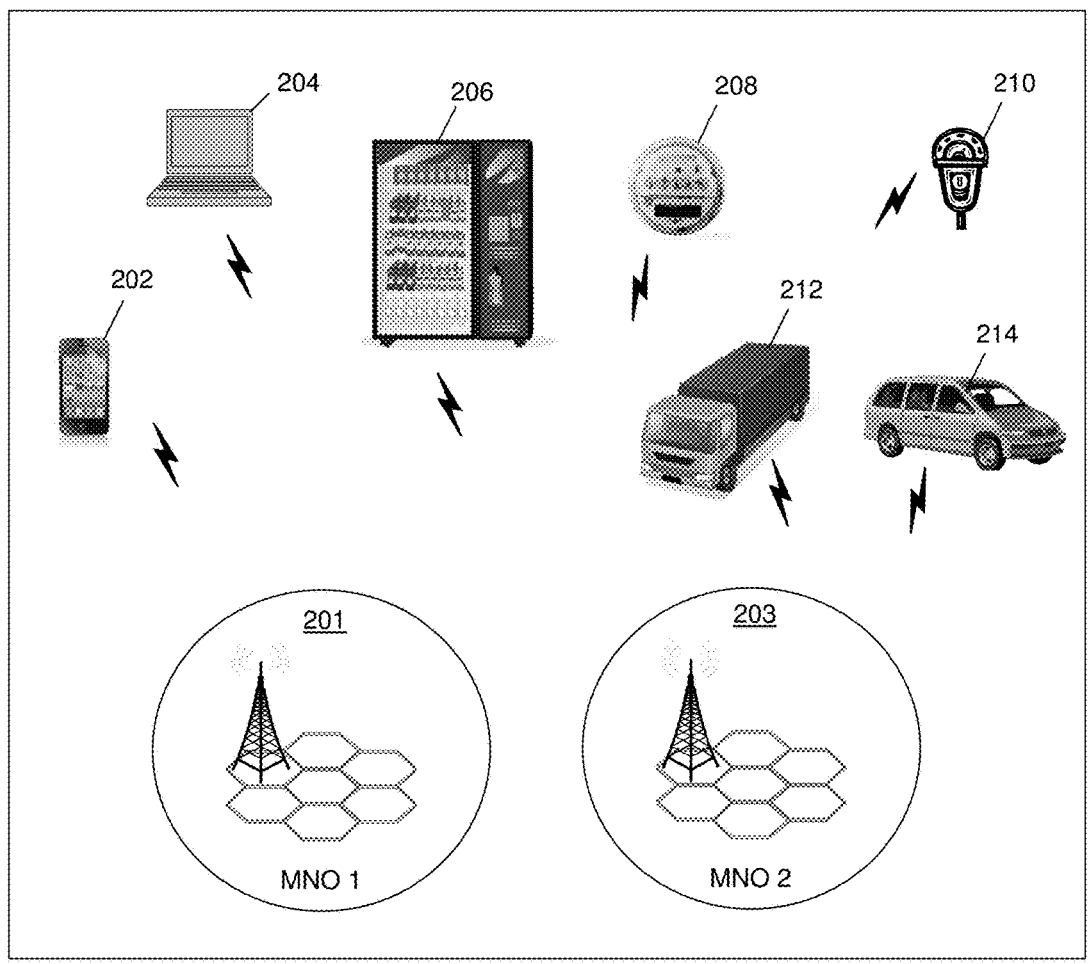
FIG. 2 depicts an illustrative embodiment of a system including mobile network operators (MNOs) and communication devices communicatively coupled thereto.

FIG. 2 depicts a system 200 with illustrative embodiments of the communication device 100. In one embodiment, the communication device 100 can represent a consumer device such as a cellular telephone 202, a computer or laptop 204. In a commercial setting, the communication device 100 can be communicatively coupled to a vending machine 206, a utility meter 208, a parking meter 210, a commercial transport vehicle 212, or an automobile 214. In these latter embodiments, the UICC 121 can be an embedded (non-removable) device. The embodiments of the communication device 100 shown in FIG. 2 can be operable to facilitate establishment of communications with mobile network operator (MNO) 201 or MNO 203. MNO 201 and MNO 203 can operate according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on.

MNO 201 or MNO 203 provide wireless communication services to subscriber devices in large regions such as cities, states, and nationally. MNO 201 and MNO 203 are generally independently operated businesses. Consequently, the services provided by MNO 201 and MNO 203 may differ in ways that may cause interoperability issues when the software applications supported by UICC 121 of a communication device 100 attempt to utilize the services of a new MNO.

Figure 3:
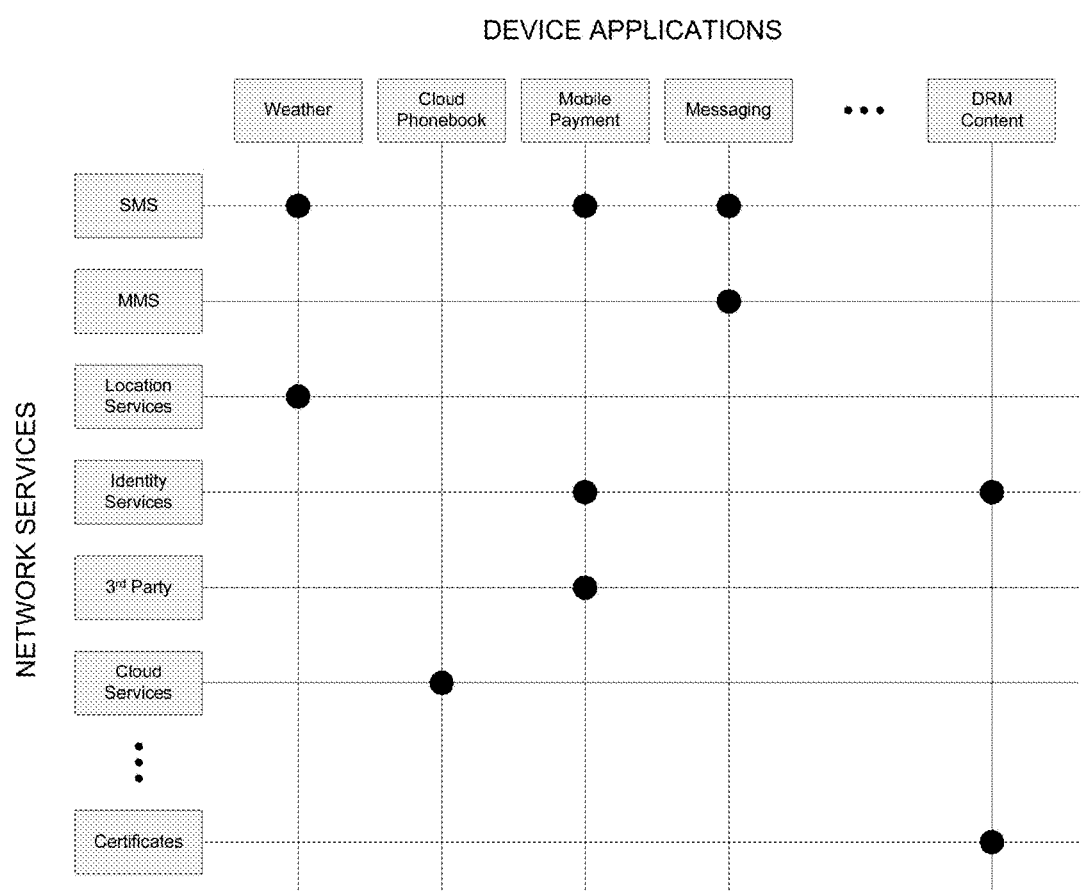
FIG. 3 depicts an illustrative embodiment of a mapping of services provided by the MNOs and software applications operating from one or more of the communication devices of FIG. 2.

FIG. 3 depicts an illustrative embodiment of a mapping of services provided by the MNOs to software applications operating from the communication devices of FIG. 2. MNO services can include, for example, text messaging services such as Short Messaging Service (SMS), multimedia messaging such as Multimedia Messaging Service (MMS), location services, identity services, third party services, cloud services, and authentication services by way of public key infrastructure (PKI) certificates, just to mention a few. Software applications executed from the communication devices of FIG. 2 can make use of the MNO services. For example, a software application for tracking weather can make use of SMS messages for alerts, and location services to identify weather conditions relative to the location of the communication device. Cloud phonebook software applications can utilize Cloud services of the MNO (e.g., an enterprise directory or personal directories stored on a webserver).

Mobile payment or ecommerce services can make use of SMS messaging, identity services, and third party services (e.g., PayPal™). Subscriber to subscriber messaging applications can make use of SMS and MMS messaging. Protected content that relies on Digital Rights Management (DRM) rules can make use of identify services and PM certificate services of the MNO. In a commercial setting where telemetry data or other useful metrics are being monitored by commercial enterprises, such enterprises may have arrangements with the MNO to link subscriber devices in the field (e.g., at a vending machine, utility meter, etc. as shown in FIG. 2) with processing devices of the commercial enterprise such as servers.

Figure 4:
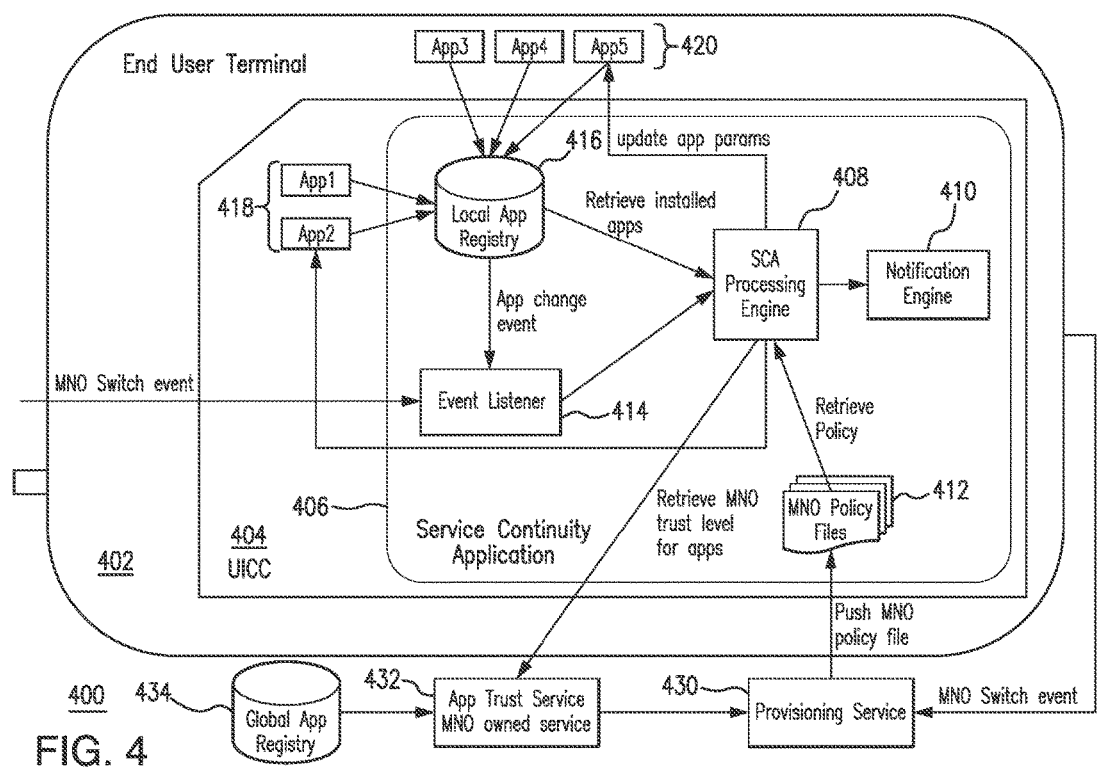
FIG. 4 depicts an illustrative embodiment of a communication device utilizing a Universal Integrated Circuit Card (UICC) to supporting among other things enablement of software applications operating from the communication device.

Subscribers such as consumers and business enterprises can invest in software applications such as described above. When a subscriber chooses to switch to a new MNO, the services of the new MNO may not operate in the same manner as the prior MNO, thereby causing interoperability issues with the software applications supported by the UICC 121. In one embodiment, the interoperability issues can be resolved with a communication device 400 configured with a UICC 404 that supports, among other things, operations of software applications operating from the communication device 400 as shown in FIG. 4.

Communication device 400 depicts an end user terminal 402 utilizing an UICC 404 with a service continuity application (SCA) 406. The SCA 406 can comprise a processing engine 408 that executes software modules such as a notification engine module 410, an MNO policy file system module 412, an event listener module 414, and a local application registry module 416 which can link to local software applications 418 executable by the UICC 402, and software applications 420 external to the UICC 402 and executable by a processor of the end user terminal 402.

The functional modules of the SCA 406 can be described as follows:

The processing engine 408 mediates interactions between functional modules of the SCA 406 and directs configuration updates to software applications resident in the UICC 402 or externally controlled by the UICC 402. The processing engine 408 can also send configuration updates to an MNO via a provisioning service 430, and an application trust service 432 having access to a global application registry 434 to identify software applications trusted by the MNO.

The notification engine module 410 can trigger external actions such as a device management session with the MNO's core network to initiate device provisioning, or information to be displayed to the user, such as ownership transfer instructions or advice on trust status of software applications.

The policy file system module 412 stores files provided by the MNO containing information necessary to ensure service continuity of user software applications such as network service configuration parameters, access and management permissions for user software applications utilizing MNO services, DRM rights certificate updates, and ownership transfer instructions.

The event listener module 414 detects a change from one MNO to another, as well as changes to the local application registry 416 indicating software applications were added or deleted.

The local application registry module 416 contains a mapping between all installed software applications and the network services and configuration parameters they require.

The SCA 406 can be installed in the end user terminal 402 by way of an embedded UICC 404 or removable UICC 404. The SCA 406 can be configured to monitor for MNO switch events. This is accomplished in the event listener module 414. The event listener module 414 is also responsible to react to application change events (add, delete, update, etc.) in order to trigger the processing/reprocessing of service continuity rules.

Software applications installed in the end user terminal 402 can be registered with the local application registry module 416. Upon receiving triggering events from the event listener module 414, the processing engine 408 can perform a trust lookup with the MNO trust service 432 to request the updated trust level for all local and external software applications 418, 420 operating from the UICC 404 or end user terminal 402 based on the MNO's own trust model. A software application can be considered trusted by one MNO but can be considered untrusted by another depending on factors determined by the MNO such as, for example, bandwidth utilization of the application, an identity of the author of the application, compliance with DRM rules, or other criteria deemed important to service personnel of the MNO.

The MNO provisioning service 430 can generate a new Device Policy Update (DPA) file during the transition process. MNO DPA files can be stored locally in the UICC 404 and can be updated based on the MNO switch event and an application change event detected by the MNO provisioning service 430. The processing engine 408 can be configured to cross reference installed software applications with an MNO Policy File to determine dependencies, and rules and to update the configuration settings of the software application.

Upon processing the rules and making all the necessary configuration updates to the affected software applications as defined by a policy file supplied by the MNO, the processing engine 408 can cause the notification engine module 410, as required, to trigger mechanisms to notify a user of the end user terminal 402, the MNO or third parties about the changes applied to the software application's configuration, and or trigger a device management session to initiate further device provisioning with provisioning service 430 of the MNO.

It should be noted that the end user terminal 402 depicted in FIG. 4 can be replaced with an integrated fixed-location communication device situated, for example, in the vending machine 206, the utility meter 208, the parking meter 210 or the vehicles 212 or 214 shown in FIG. 2.

Figure 5:
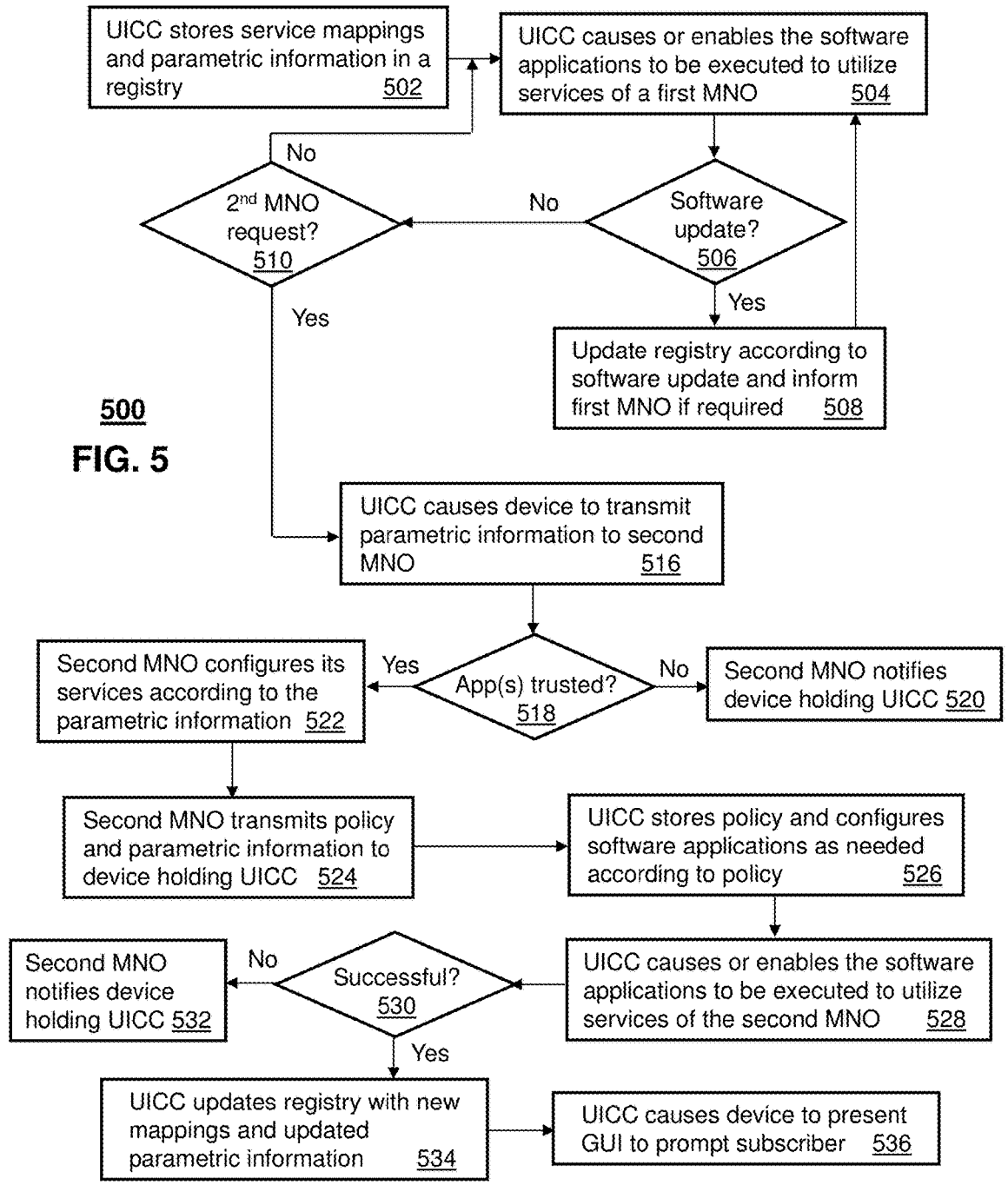
FIG. 5 depicts an illustrative embodiment of a method for transitioning between the MNOs of FIG. 2.

FIG. 5 depicts an illustrative embodiment of a method 500 for transitioning between services provided by the MNOs 202 and 204 of FIG. 2 utilizing, for example, the communication device 400 of FIG. 4. Method 500 can begin with step 502 in which the UICC 404 stores service mappings and parametric information in the local registry module 416. The mappings can represent service to software application mappings similar to those shown in FIG. 3. The parametric information can represent configuration information which is used by an MNO service to configure the service to interoperate with one or more of the software applications 418 and 420. The parametric information can also represent configuration information used to configure the software applications 418 and 420 in accordance with service policy information stored in the file system 412. In step 504, the UICC 404 can cause or enable all or some of the software applications 418 and 420 to be executed. At step 506, the UICC 404 can track when a software application update has taken place.

A software application update can represent a deletion of an existing software application, a modification, version update, or reconfiguration of an existing software application, or an addition of a new software application. The update of a software application can result from user input, external messages received by the end user terminal 402, or other suitable techniques for updating software applications supported by the UICC 404. If a software application update is detected at step 506, the UICC 404 can proceed to update the registry 416, and if needed, inform the MNO of the update by way of, for example, the provisioning service 430 and/or the application trust service 432.

If a software update has not been detected, the UICC 404 can proceed to step 510 where it monitors events for transitioning between MNOs (e.g., transitioning from MNO 202 to MNO 204 of FIG. 2). The transition between MNOs can be initiated by the subscriber at any time by, for example, establishing a new agreement with an MNO. If a transition event is not detected at step 510, the UICC 404 continues to execute or enable software applications as requested at step 504 and monitor software updates at step 506. If an MNO transition is detected, the UICC 404 can proceed to step 516 where the UICC transmits to the second MNO via the end user terminal 402 parametric information descriptive of software applications resident in the UICC 404 and external to the UICC 404.

The parametric information can include, for example, the names, versions, model no's, serial no's, or other identification data of the software applications along with information descriptive of the MNO services desired by each software application, and the operational features, conditions, or requirements necessary to configure the MNO services to interoperate with the software applications. At step 518, the second MNO can review by way of the application trust service 432 the identity of the software applications and determine if the software applications are trusted by the second MNO. Trust criteria can be established by the second MNO. Software applications that were trusted by the first MNO may not be trusted by the second MNO because, for example, personnel of the second MNO have determined that allowing a particular software application can cause network congestion, interoperability issues with the services of the second MNO, or the software application is not recognized by the second MNO, or has known defects that have not been mitigated to the satisfaction of personnel of the second MNO. Other criteria may be defined by the second MNO. Such criteria can be updated periodically and result in a previously trusted software application no longer being trusted.

If a software application is not trusted, the UICC 404 can proceed to step 520 where it generates a notification by way of, for example, the notification engine module 410. The notification may be submitted to the user of the end user terminal 402. The user can be presented, for example, with a GUI that informs the user that some services cannot be supported by the second MNO. For any and all software applications that have been determined to be trusted by the second MNO at step 518, the second MNO proceeds to step 522 where it configures its services by providing appropriate parametric information to the UICC 404.

At step 524, the second MNO transmits policy and parametric information to the UICC 404 which it stores in the MNO Policy files 412 at step 526. The policy information can represent usage policies for defining proper usage of services provided by the MNO, while the parametric information can include operational information such as server addresses for accessing services of the MNO. In the same step, the UICC 404 can utilize configuration information provided in the policy files to update the local registry module 416 and thereby configure operational parameters of the software applications. The configuration of the services of the second MNO and the policy information used to configure the software applications supported by the UICC 404 enables the software applications and the MNO services to be interoperable. At step 528, the UICC 404 can execute one or more local software applications 418 requested by user input or by automated schedules. Alternatively, the UICC 404 can enable by way of the configuration information stored in the registry 416 one or more external software applications 420 for execution by a processor of the end user terminal 402 according to user input detected thereby. If interactions between the MNO services and the software applications do not cause execution errors or trigger alarms at either the second MNO or the software applications, then the UICC 404 can proceed to step 534 to update the registry module 416 with new mappings and updated parametric data descriptive of the requirements set by the second MNO via the policy files.

The UICC 404 can also be configured to present at step 536 a GUI to prompt the subscriber if necessary. The prompt can present, for example, a new fee schedule for utilizing the MNO services if a fee agreement was not pre-arranged, or if new service options are offered by the second MNO. The prompt can also confirm to the subscriber that the transition was successful and that the software applications are successfully utilizing the MNO services. If, on the other hand, one or more software applications did not successfully interoperate with the MNO services, the new MNO can notify the UICC 404 at step 532 that an error has occurred. The UICC 404 can be configured to notify the subscriber of the issue and remain communicatively coupled to the second MNO while other software applications not having interoperability issues continue to be serviced by the second MNO. The subscriber can, among other things, contact personnel of the second MNO to address the error.

The foregoing embodiments provide a suitable solution for maintaining interoperability between MNO services and software applications during a transition between MNOs without requiring a replacement of the UICC.

Figure 6:
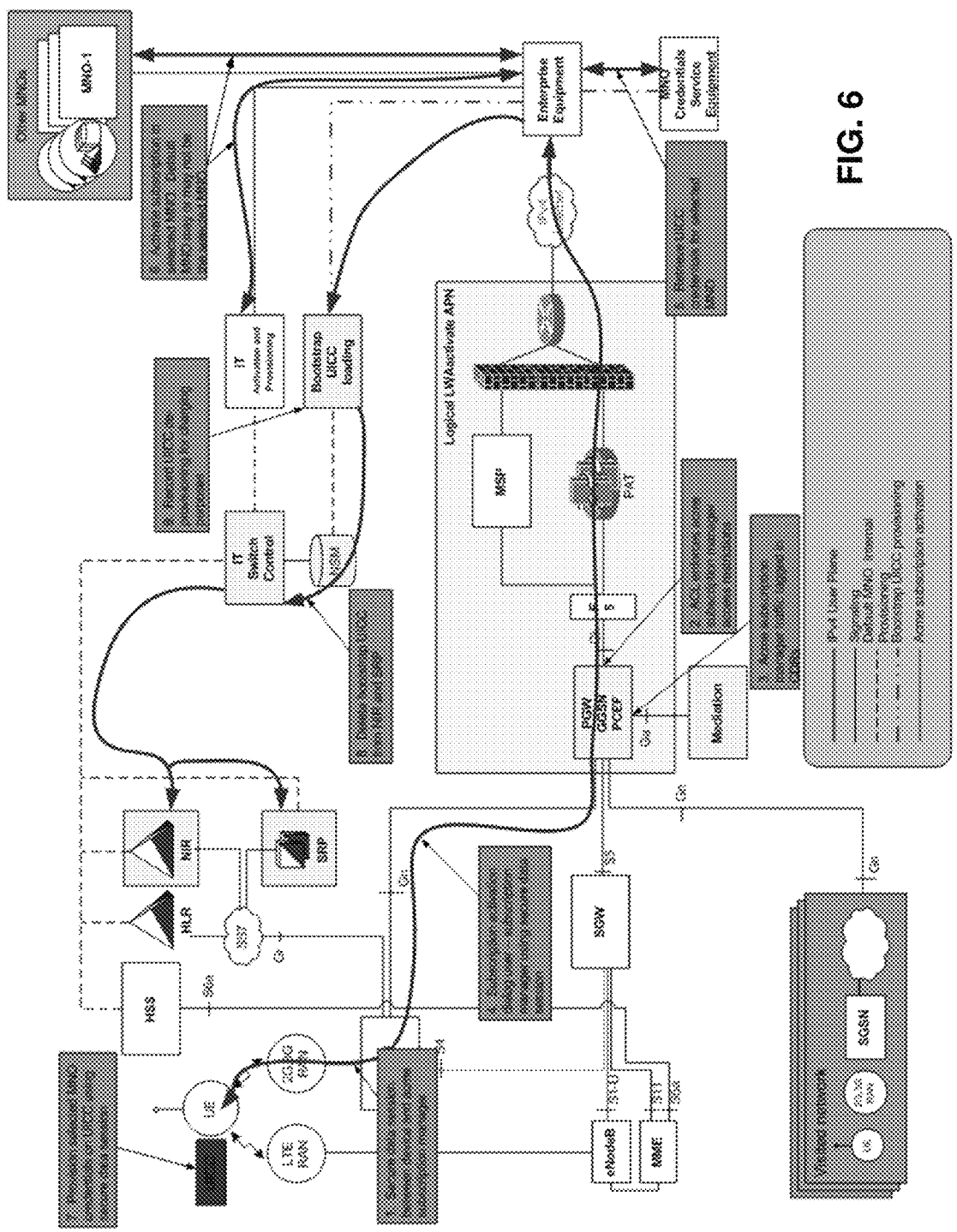
FIG. 6 depicts an illustrative embodiment of a system for provisioning end user terminals including a UICC to utilize services of one of a plurality of MNOs.
Figure 7:
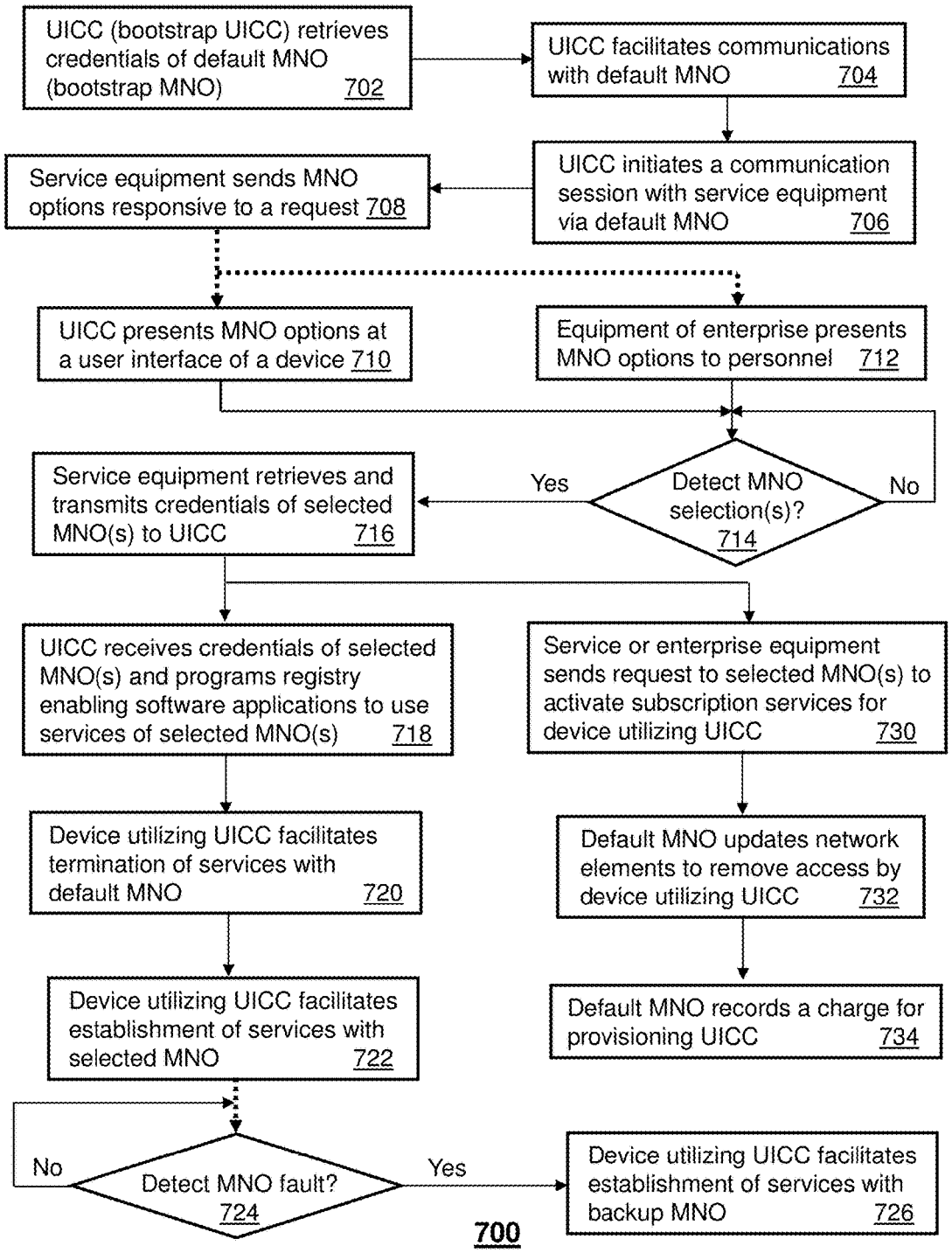
FIG. 7 depicts an illustrative embodiment of a method for provisioning the UICC of the end user terminal of FIG. 6.

FIG. 6 depicts an illustrative embodiment of a system 700 for provisioning end user terminals including a UICC to utilize services of one of a plurality of MNOs. FIG. 7 depicts an illustrative embodiment of a method 700 for provisioning the UICC of the end user terminal of FIG. 6. Method 700 begins with step 702 in which a bootstrap UICC retrieves credentials of a default MNO. In the present context the term "bootstrap" can represent an initial provisioning of the UICC with credentials of one or more default MNOs (bootstrap MNOs). The credentials of the default MNOs can be stored in the UICC at the time the UICC is manufactured, installed in end user terminal, or provisioned with a default setting by other suitable means.

At step 704, the UICC can cause the end user terminal to facilitate communications with the default MNO according to the credentials. At step 706, the UICC can initiate a secure communication session with service equipment that stores and distributes MNO credentials. The service equipment can be equipment of a UICC vendor, equipment of the default MNO, or equipment of a third party responsible for maintaining, and distributing MNO credentials. At step 708, the service equipment sends MNO options to the UICC via the secure communication session, or to equipment of an enterprise for presenting selectable options for MNOs. In one embodiment, the UICC causes the end user terminal to present at a user interface (e.g., display) selectable MNO options to a user of the end user terminal. Alternatively, in a commercial setting, the equipment of the enterprise presents selectable MNO options to personnel at a computer terminal. The enterprise personnel can be tasked to manage selection of MNOs for end user terminals of the enterprise based on usage policies of the enterprise.

At step 714, the service equipment can detect one or more MNO selections and proceed to step 716 to retrieve credentials of the selected MNO(s) and transmit the credentials to the UICC. In an enterprise setting, the enterprise personnel may select more than one MNO for backup purposes (e.g., preferred MNO and backup MNO). Accordingly, when a preferred MNO experiences a communication fault, the UICC can be configured with credentials of a backup MNO. Such a configuration enables enterprise customers to increase the reliability of communication services provided to end user terminals of the enterprise. At step 718, the UICC updates the registry with the received credentials of the MNO(s). At step 718, the end user terminal utilizes the UICC to facilitate termination of communication services with the default MNO and thereafter initiates in step 722 communication services with the selected MNO according to the credentials provided in the registry of the UICC. If a backup MNO is provided, the end user terminal or the UICC can monitor communication faults with the preferred MNO at step 724, and if a fault is detected, cause the end user terminal to transition to the backup MNO at step 726.

Contemporaneous with steps 718-720, the service or enterprise equipment at step 720 can be configured to send a request to the selected MNO(s) to activate subscription services for the end user terminal utilizing the UICC. At step 732, the default MNO updates network elements such as the Service Routing Point (SRP) and the Network Identity Register (NIR) to remove the UICC from its records, thereby removing the bootstrap settings. In addition, the default MNO at step 734 can record a charge for provisioning the UICC. The charge can be applied to a subscriber associated with the end user terminal or the enterprise controlling the MNO selection for end user terminals.

It should be noted that FIGS. 6-7 can be modified for additional applications. For example, the term "end user terminal" referred to in FIGS. 6 and 7 can be replaced with a non-portable terminal that may be utilized in an industrial setting such as a device attached to an automobile for delivering telemetry data to a central station, a vending machine for tracking consumer usage, and so on. Additionally, the techniques described in method 500 for maintaining continuity of services can be applied to the embodiments of method 700. Similarly, the embodiments of method 700 can be utilized to supplement the embodiments of method 500.

Figure 8:
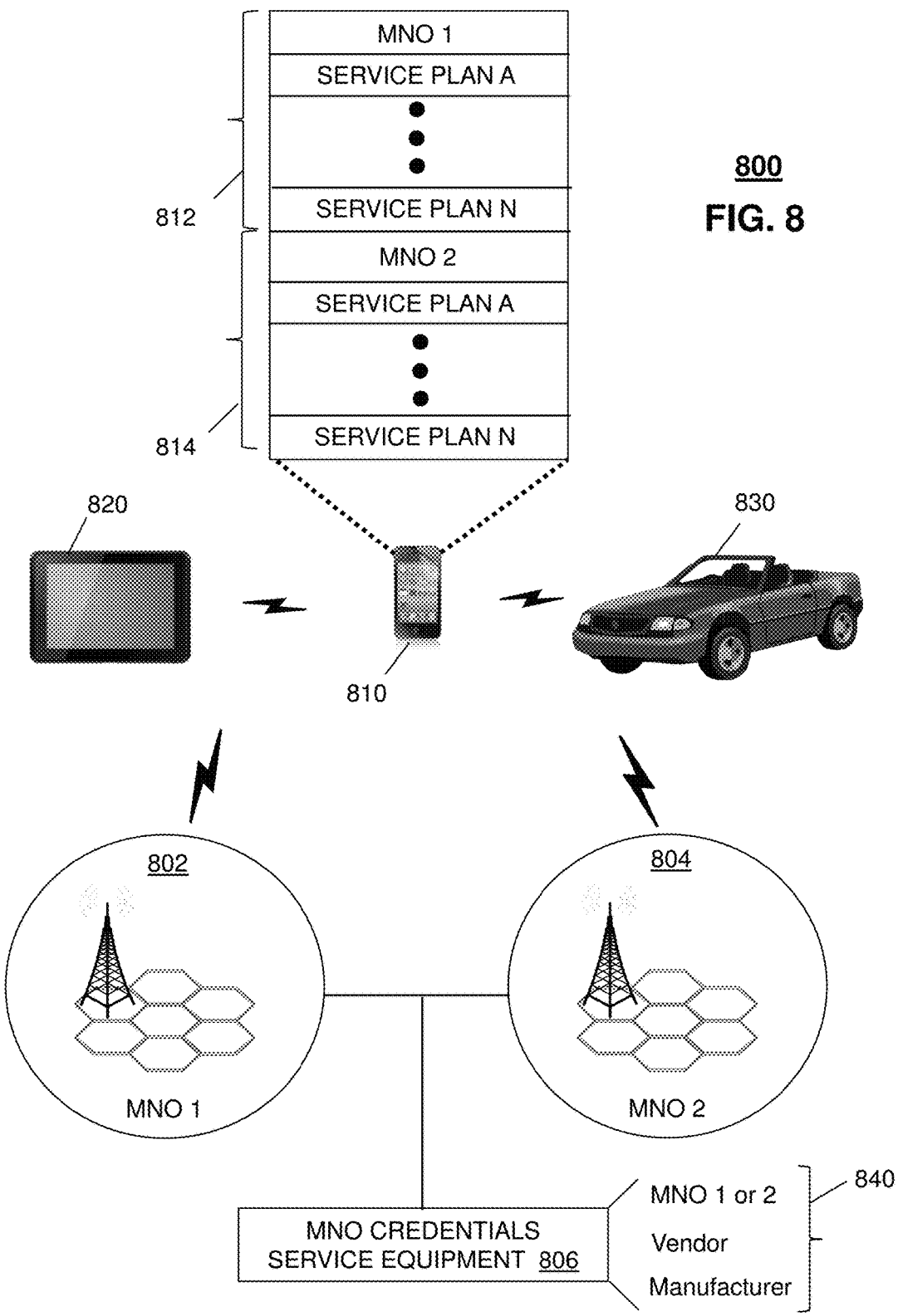
FIG. 8 depicts an illustrative embodiment of a system for peer-to-peer provisioning of a UICC of a device to utilize services of one of a plurality of MNOs.
Figure 9:
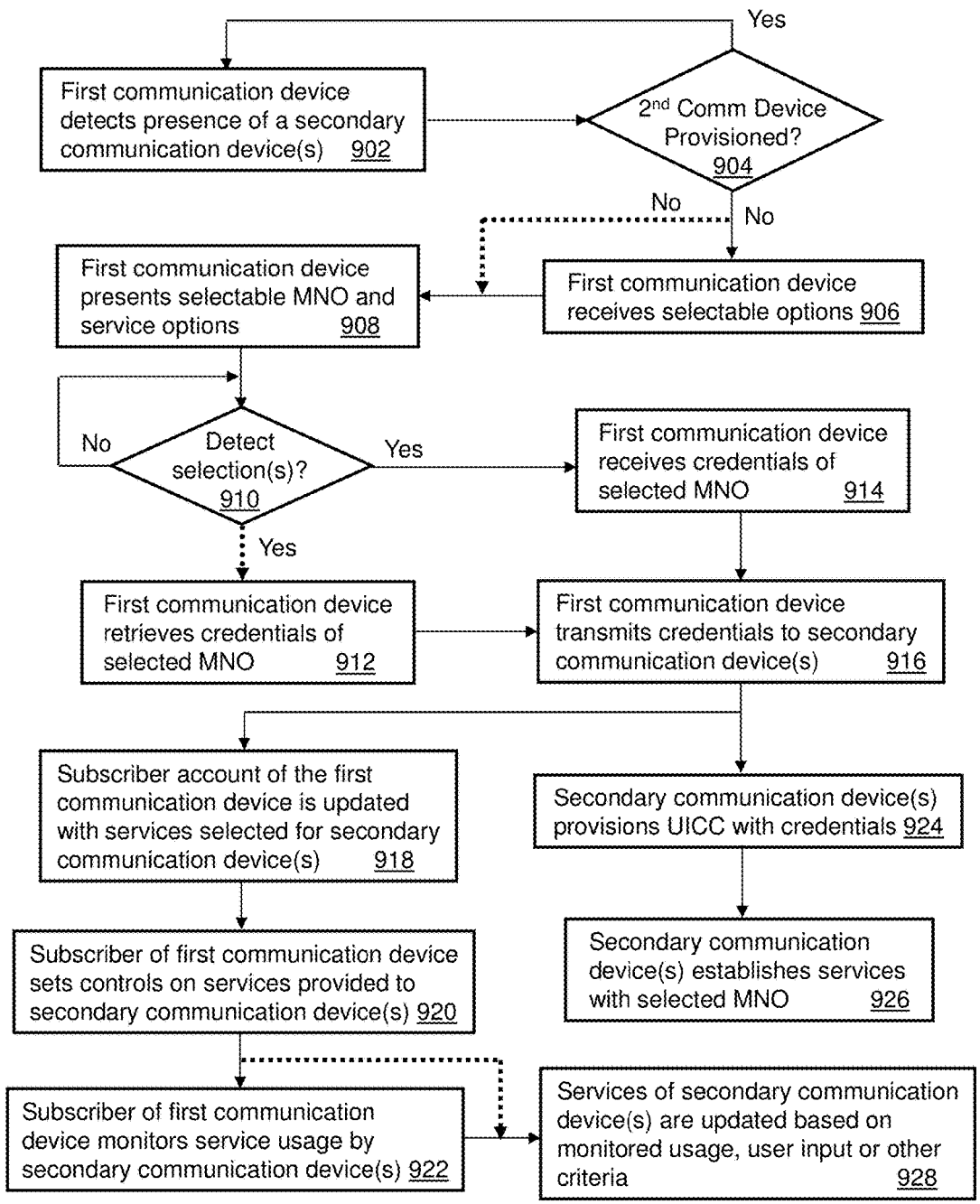
FIGS. 9-10 depict illustrative embodiments of methods for provisioning and distributing MNO credentials to devices in the peer-to-peer configuration of FIG. 8.

FIG. 8 depicts an illustrative embodiment of a system 800 for peer-to-peer provisioning of devices to utilize services of one of a plurality of MNOs. FIG. 9 depicts an illustrative embodiment of a method 900 for provisioning devices of FIG. 8 in the illustrated peer-to-peer configuration. Method 900 begins with step 902 where a first communication device 810 detects a presence of secondary communication devices 820 or 830. The presence detection can be based on a peer-to-peer session such as a Bluetooth communication session, or WiFi communication session. Alternatively, presence may be detected from an explicit request received from the secondary communication devices 820 or 830 over a wireless access technology such as Bluetooth, WiFi, or other suitable technologies such as cellular communications in situations where, for example, the secondary communication devices 820 and 830 are utilizing the bootstrap embodiments described by FIGS. 6-7.

The first communication device 810 in the present illustration can be a smartphone. It is contemplated, however, that the first communication device 810 can be any type communication device with wireless access capabilities. Secondary communication device 820 can represent a tablet device with wireless communication capabilities. Secondary communication device 830 can represent a communication device embedded in an automobile. It is contemplated that the secondary communication devices 810 and 820 can be any type of communication device with wireless access capabilities. In another embodiment, it is contemplated that communications between the first and secondary communication devices 810, 820 and 830 can be tethered over a cable interface such as a USB or proprietary cable interface. Combinations of wireless or wired access between the first and secondary communication devices 810, 820 and 830 is also contemplated.

For illustration purposes only, secondary communication device 820 will be referred to in the descriptions that follow for method steps 904-928. It should be understood that method steps 904-928 are similarly applicable for secondary communication device 830. With this in mind, first communication device 810 can determine in step 904 whether a UICC utilized by the secondary communication device 820 has been provisioned. If it has, then the first communication device 810 can proceed to step 902 and await detecting a presence of another device such as secondary communication device 830. If, however, the UICC of the secondary communication device 820 is determined to be unprovisioned by the first communication device 810 at step 904, then the first communication device 810 can proceed to either step 906 or 908.

In one embodiment, the first communication device 810 can proceed to step 906 if the first communication device 810 does not have previously stored selectable options of MNOs other than the one the first communication device 810 operates from. In step 906, the UICC of the first communication device 810 can establish a secure communication link with service equipment 806 shown in FIG. 8 by way of the MNO the first communication device 810 is receiving services from, which will be assumed to be MNO 802 (or MNO 1) for illustration purposes only. The service equipment 806 can be used for securely storing and managing the distribution of MNO credentials. The service equipment 806 can be managed by one or more MNOs under a cooperation arrangement between the MNOs. Upon establishing the secure link with the service equipment 806, the UICC of the first communication device 810 can request and thereby receive a plurality of selectable options of MNOs to present the secondary communication device 820.

At step 908, the first communication device 810 presents the plurality of selectable options at a display device of the first communication device 810. If the first communication device 810 has previously received from the service equipment 806 selectable MNO options which it has stored in memory, then step 906 can be skipped. The selectable MNO options can be as shown in FIG. 8. The selectable MNO options can include a first selectable option 812 for MNO 1 with corresponding service plans A through N, a second selectable option 814 for MNO 2 with corresponding service plans A through N, and more if additional MNO's are available. If an MNO and service plan selection is detected at step 910, the first communication device can proceed to either step 912 or 914. If the first communication device 810 has not received MNO credentials for the selected option on previous occasions, then the first communication device 810 can proceed to step 914 where it receives the credentials of the selected MNO and service plan from the service equipment 806 by way of MNO 802. If, however, the first communication device 810 has previously received and stored the requested MNO credentials, then step 914 can be skipped and the first communication device 810 can proceed to step 912 where it retrieves the credentials from its local memory.

At step 916, the first communication device 810 transmits the credentials to the secondary communication device 820 over a secure link of the peer-to-peer communication session established therebetween at step 902. In one embodiment, a subscriber account of the first communication device 810 can be updated at step 918 according to the MNO and service plan selected for the secondary communication device 820. This step can, for example, result in the subscriber account being upgraded to a family account managed and billed to the subscriber of the first communication device 810. Contemporaneous with updating the subscriber account, the secondary communication device 820 can provision at step 924 the UICC with the received credentials in a manner as described in whole or in part by the previously described embodiments of methods 500 and 700. Once provisioned, the UICC of the secondary communication device 820 can facilitate establishment of communication services with the selected MNO at step 926 according to the given credentials, service policies and parametric information shared between the selected MNO and the UICC of the secondary communication device 820. If the selected MNO is, for example, MNO 804, then the secondary communication device 820 will utilize the services of MNO 804 as prescribed by the service policies provided by MNO 804. Similar results would occur if the selected MNO is MNO 802.

At step 920 the first communication device 810 can further establish usage controls on the services provided by the secondary communication device 820. The usage controls can, for example, establish time of day usage limits (e.g., communication services available only from 8 am-5 pm), number of days or time usage limits (e.g., communication services terminate after X days or minutes), data plan limits (e.g., data service terminates after 200 Mbytes on particular days or every day), warning notices for exceeding planned limits, termination of service triggers, and so on. Additionally, the subscriber can be allowed to upgrade, modify, or terminate services provided to the secondary communication device 820 from the account of the subscriber, which may be controlled from a portal, the first communication device 810, or some other device accessible to the subscriber. In one embodiment, the subscriber of the first communication device 810 can monitor usage of services of the selected MNO by the secondary communication device at step 922 by receiving at the first communication device 810 (or another device identified by the subscriber) periodic reports from the selected MNO.

In one embodiment, the services provided to the secondary communication device 820 by the selected MNO can be updated at step 928 by user input detected at the first communication device 810 or by automatic triggers set at the first communication device 810, or triggers provisioned at a server communicatively coupled to the selected MNO that can control and update services provided to the secondary communication device 820 as requested by the subscriber of the first communication device 810.

Figure 10:
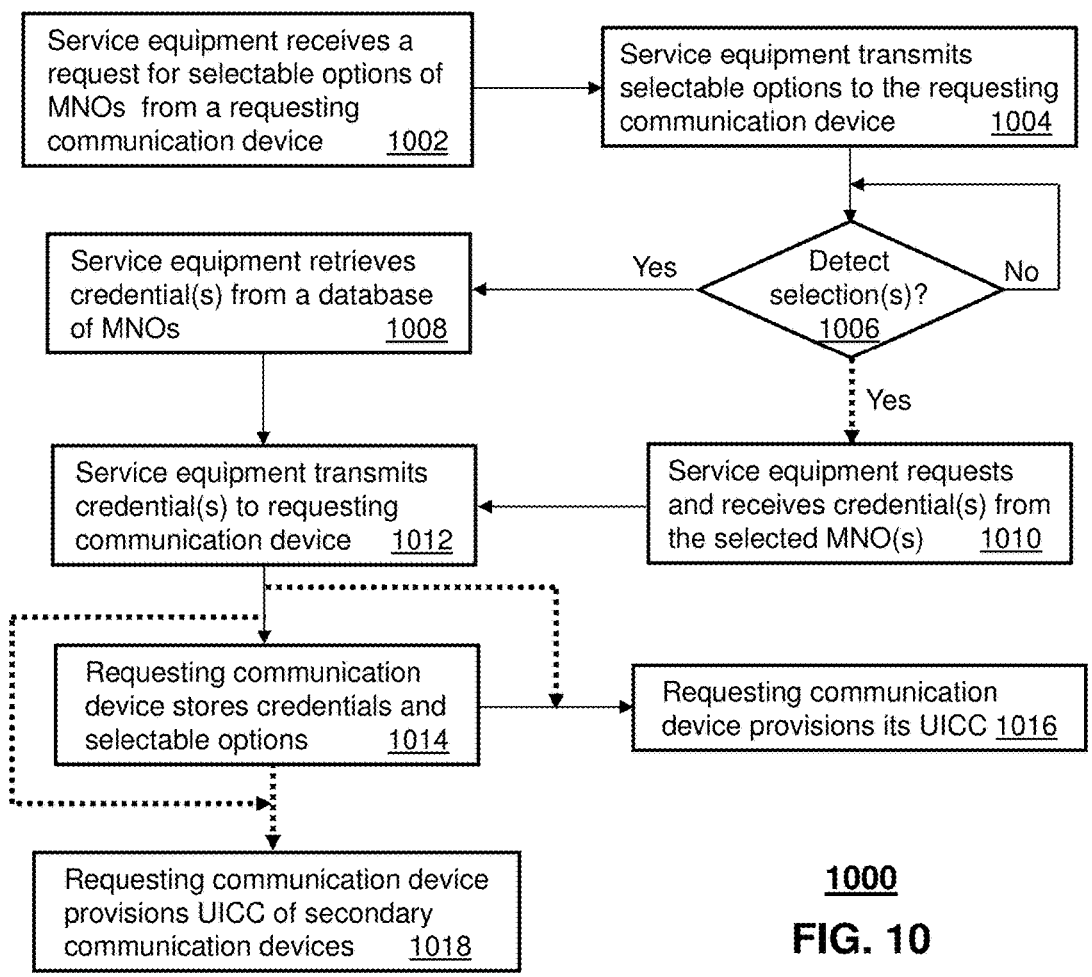

FIG. 10 depicts an illustrative embodiment of a method 1000 for distributing MNO credentials. Method 1000 begins with step 1002 in which service equipment 806 receives a request for selectable options of services of one or more MNOs. In one embodiment, the service equipment 806 can represent a subscription manager that distributes MNO credentials. The service equipment 806 can be operated by one or more disparate or unaffiliated entities 840. In one embodiment, the service equipment 806 can be operated by the MNOs under a cooperative agreement in which each MNO shares its credentials with other MNOs and the aggregate of credentials is stored by the service equipment 806 or a database accessible by the service equipment 806. In this embodiment, a communication device can access the service equipment 806 by way of any MNO to which the communication device is communicatively coupled to, such as, for example, a bootstrap MNO.

In another embodiment, the service equipment 806 can be operated by a vendor of UICC's or communication devices including a UICC. A vendor can represent, for example, a retailer of communication devices, an original equip manufacturer of the UICC's or communication devices or both, a distributor of communication devices, a wholesaler of communication devices, a software vendor of software applications or operating systems, or any other suitable entity that in some fashion distributes, sells, or otherwise supplies communication devices, UICC's, or both to other entities or end users.

In yet another embodiment, the service equipment 806 can be operated by a manufacturer of components used by the communication devices, such as, for example, manufacturers of chipsets used by the communication devices. Such chipsets can represent, for example, the transceiver portion and/or baseband controller portion of the communication device, or other suitable components. Such a manufacturer may also supply with the chipset a hardware or software implementation of a UICC with the chipset. The UICC portion can also be provisioned in whole or in part at the time that it is manufactured by the manufacturer.

There can be other embodiments for entities or parties that may operate the service equipment 806. For example, operation of the service equipment 806 may be delegated under a service agreement to an unaffiliated third party used by any of the aforementioned entities 840. Accordingly, other entities or parties who may directly or indirectly manage operations of the service equipment 806 of FIG. 8 are contemplated by the present disclosure.

Referring back to FIG. 10, at step 1004, the service equipment 806 can be configured to transmit selectable MNO options to the requesting communication device. The requesting communication device can utilize this information for selecting MNO services for itself or for provisioning a secondary communication device in a peer-to-peer configuration as illustrated in FIG. 8. If the service equipment detects at step 1006 a selection of one or more MNOs, the service equipment 806 proceeds to step 1008 or 1010. At step 1008, the service equipment 806 can retrieve the credentials from a database of MNOs that may be local or remote to the service equipment 806. In another embodiment, the service equipment 806 can submit at step 1010 one or more requests to the selected MNOs and receive from the selected MNOs their respective credentials. In either embodiment, the service equipment 806 can be configured to transmit to the requesting communication device at step 1012 the credentials of the selected MNOs.

In one embodiment, the requesting communication device can store at step 1014 the credentials and selectable options for future use. The credentials and selectable MNO options can be stored in the UICC of the requesting communication device or another suitable memory location. By storing this information, the requesting communication device can provision secondary communication devices in future instances without submitting requests to the service equipment 806. Alternatively, step 1014 can be skipped, and one of steps 1016 or 1018 can be performed by the requesting communication device. At step 1016, the requesting communication device can update the registry of its own UICC with the received credentials when the selected MNO(s) were intended for use by the requesting communication device. If, on the other hand, the selected MNO(s) were intended for use by a secondary communication device, the requesting communication device can proceed to step 1018 and provision the UICC of the secondary communication device with the received credentials in a peer-to-peer communication session such as illustrated in FIG. 8.

Upon reviewing these embodiments, it would be evident to an artisan with ordinary skill in the art that said embodiments can be modified, reduced, or enhanced without departing from the scope and spirit of the claims described below. For example, the UICC 404 and its functional modules can be integrated as software components of a microprocessor utilized by the communication device. In this embodiment, the microprocessor performs communication functions as well as the functions described above for the UICC without the additional hardware of a UICC. This embodiment can be referred to as a "soft" UICC configured according to the embodiments described herein. In the foregoing embodiments, the term "MNO" can be replaced with a Landline Network Operator (LNO). An LNO may support circuit switched or packet switched landline communications. In one embodiment, an end user terminal 402 configured with a landline interface (see transceiver 102 of FIG. 1) may be accessible by the LNO.

A UICC utilized by the end user terminal 402 with the landline interface can be configured to perform the functions of method 500 for maintaining service continuity when transitioning between LNOs. In another embodiment, an end user terminal 402 capable of landline and wireless communications, can include a UICC configured for maintaining service continuity for LNO to MNO transitions, and vice-versa. Accordingly, method 500 can be adapted for maintaining service continuity between network operators of various access technologies. Other embodiments are contemplated by the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 11:
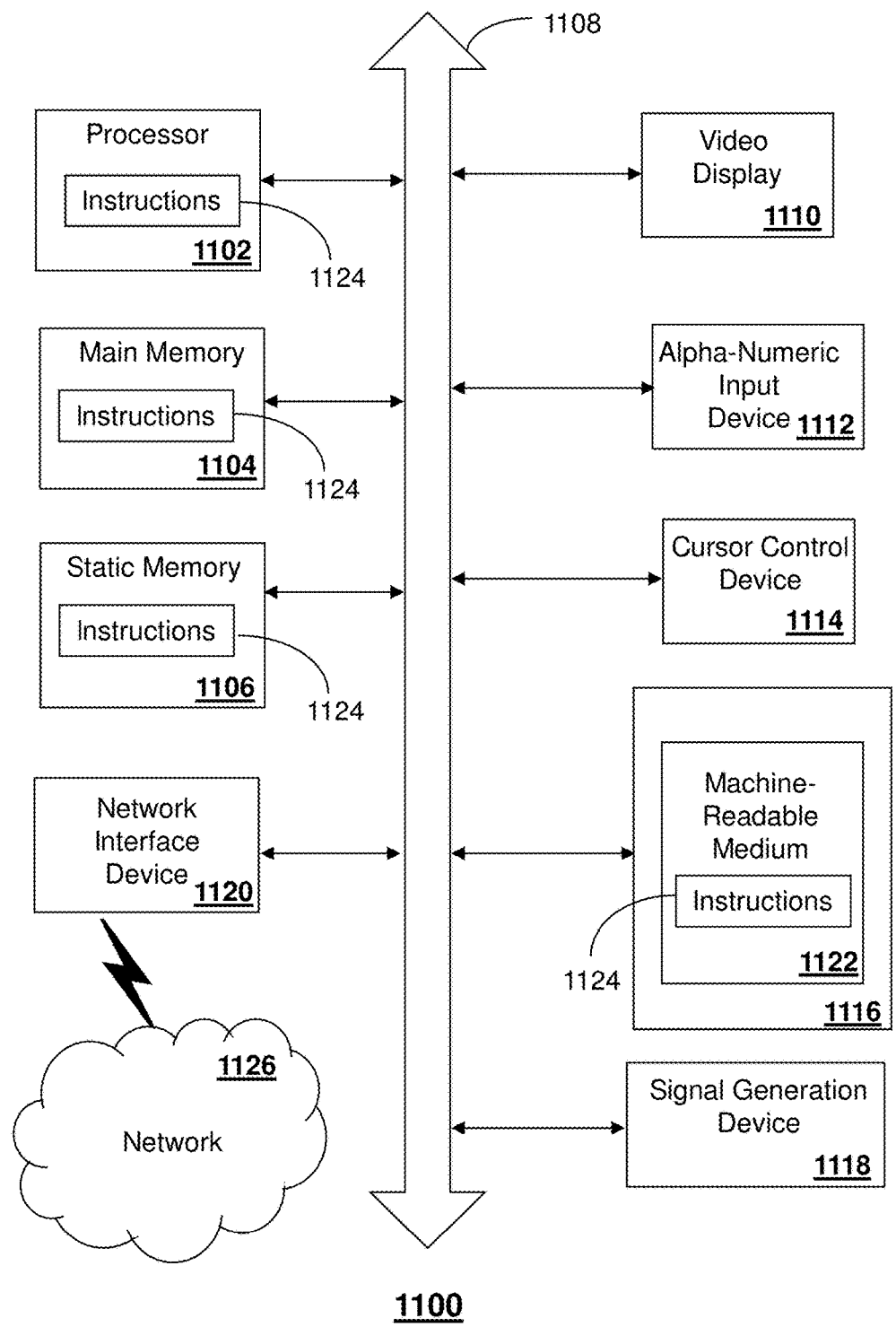
FIG. 11 is a diagrammatic representation of a machine in the form of a computer system within which a set of instructions, when executed, may cause the machine to perform any one or more of the methods described herein.

FIG. 11 depicts an exemplary diagrammatic representation of a machine in the form of a computer system 1100 within which a set of instructions, when executed, may cause the machine to perform any one or more of the methods discussed above. One or more instances of the machine can operate, for example, as the communication devices 100 and 400 of FIGS. 1 and 4, and their respective subcomponents, such as the UICC. One or more instances of the machine can also operate, for example, as devices of FIGS. 6 and 8. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1100 may include a processor (or controller) 1102 (e.g., a central processing unit (CPU), a graphics processing unit (GPU, or both), a main memory 1104 and a static memory 1106, which communicate with each other via a bus 1108. The computer system 1100 may further include a video display unit 1110 (e.g., a liquid crystal display (LCD), a flat panel, or a solid state display. The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120.

The disk drive unit 1116 may include a tangible computer-readable storage medium 1122 on which is stored one or more sets of instructions (e.g., software 1124) embodying any one or more of the methods or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 1122 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 1100.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory machine-readable storage medium, comprising instructions which, responsive to being executed by a processor of a first end user device, cause the processor to perform operations comprising:

providing, to equipment of a first mobile network operator, a request to select a service provided by a plurality of mobile network operators, wherein the first end user device includes a first universal integrated circuit card, wherein the providing of the request is based on default credential information stored in the first universal integrated circuit card of the first end user device, and wherein the first mobile network operator is a bootstrap mobile network operator that enables network communications for activating services provided by other mobile network operators;

receiving, from the equipment of the first mobile network operator, information indicating a plurality of selectable options for selecting the service;

providing, to the equipment of the first mobile network operator, a selection from the plurality of selectable options, wherein the selection identifies a second mobile network operator from among the plurality of mobile network operators;

receiving, from the equipment of the first mobile network operator, second credential information of the second mobile network operator, wherein the first mobile network operator provides instructions to a network element of the first mobile network operator to prevent network access based on the default credential information by the first end user device;

storing the second credential information in the first universal integrated circuit card; and activating subscription services including the service provided by the second mobile network operator.

2. The non-transitory machine-readable storage medium of claim 1, wherein a service plan associated with the service of the second mobile network operator is received by the equipment of the first mobile network operator, and wherein the service plan is applied to use of the service by a second end user device provided with the second credential information of the second mobile network operator.

3. The non-transitory machine-readable storage medium of claim 2, wherein the selection identifies the service plan for the service of the second mobile network operator that is selected from among a group of service plans, wherein the providing of the second credential information of the second mobile network operator to the second end user device enables a second universal integrated circuit card of the second end user device to store the second credential information in the second universal integrated circuit card and to initiate the service with equipment of the second mobile network operator according to the second credential information and the service plan.

4. The non-transitory machine-readable storage medium of claim 1, wherein the equipment of the first mobile network operator obtains the second credential information from a database that stores credentials of the plurality of mobile network operators.

5. The non-transitory machine-readable storage medium of claim 4, wherein the database is shared by the plurality of mobile network operators enabling equipment of each of the plurality of mobile network operators to distribute credentials of the plurality of mobile network operators to universal integrated circuit cards of portable end user devices.

6. The non-transitory machine-readable storage medium of claim 1, wherein the equipment of the first mobile network operator obtains the second credential information from the second mobile network operator.

7. The non-transitory machine-readable storage medium of claim 1, wherein the first mobile network operator and the second mobile network operator are independently operated entities.

8. A first end user device, comprising:

a first universal integrated circuit card that stores default credential information of a default mobile network operator;

a processing system including a processor and being coupled with the first universal integrated circuit card; and a memory that stores executable instructions that, when executed by the processing system, facilitate performance of operations, comprising:

providing, to equipment of the default mobile network operator, a request to select a service provided by a plurality of mobile network operators, wherein the providing of the request to select is based on the default credential information, and wherein the default mobile network operator is a bootstrap mobile network operator that enables network communications for activating services provided by other mobile network operators;

receiving, from the equipment of the default mobile network operator, information indicating a plurality of selectable options for selecting the service;

providing, to the equipment of the default mobile network operator, a selection from the plurality of selectable options, wherein the selection identifies a second mobile network operator from among the plurality of mobile network operators;

receiving, from the equipment of the default mobile network operator, second credential information of the second mobile network operator, wherein the equipment of the default mobile network operator obtains the second credential information from a database that stores credentials of the plurality of mobile network operators, and wherein the database is accessible by the plurality of mobile network operators enabling equipment of each of the plurality of mobile network operators to distribute credentials of the plurality of mobile network operators to universal integrated circuit cards of portable end user devices;

storing the second credential information in the first universal integrated circuit card; and providing, to equipment of the second mobile network operator, a request to activate subscription services including the service provided by the second mobile network operator, wherein the providing of the request to activate is based on the second credential information.

9. The first end user device of claim 8, wherein the operations further comprise:
determining that a second universal integrated circuit card of a second end user device is not provisioned with the service of the second mobile network operator; and
providing, to the second universal integrated circuit card of the second end user device, the second credential information of the second mobile network operator.

10. The first end user device of claim 9, wherein the selection identifies a service plan for the service of the second mobile network operator that is selected from among a group of service plans, wherein the providing of the second credential information of the second mobile network operator to the second universal integrated circuit card of the second end user device enables the second universal integrated circuit card to store the second credential information in the second universal integrated circuit card and to initiate the service with equipment of the second mobile network operator according to the second credential information and the service plan.

11. The first end user device of claim 8, wherein the default credential information of the default mobile network operator is provisioned to the first universal integrated circuit card during manufacture of the first universal integrated circuit card.

12. The first end user device of claim 8, wherein the operations further comprise receiving policy information from the second mobile network operator, wherein the policy information is associated with usage rules for the service provided by the second mobile network operator.

13. The first end user device of claim 8, wherein the operations further comprise receiving operational information from the second mobile network operator, wherein the operational information enables applications executed by the first end user device to be compatible with the second mobile network operator.

14. A method, comprising:
receiving, by equipment of a default mobile network operator, a request initiated by a first end user device for selecting a service, wherein the first end user device includes a first universal integrated circuit card, wherein the receiving of the request is based on default credential information stored in the first universal integrated circuit card of the first end user device, and wherein the default mobile network operator is a bootstrap mobile network operator that enables network communications for activating services provided by other mobile network operators;
transmitting, by the equipment of the default mobile network operator, information for presenting at a user interface of the first end user device a plurality of selectable options to select the service from among a plurality of mobile network operators;
receiving, by the equipment of the default mobile network operator from the first end user device, a selection from the plurality of selectable options, wherein the selection identifies a second mobile network operator from among the plurality of mobile network operators;
obtaining, by the equipment of the default mobile network operator, second credential information of the second mobile network operator;
providing, by the equipment of the default mobile network operator to the first end user device, the second credential information of the second mobile network operator to enable the first end user device to store the second credential information in the first universal integrated circuit card and to activate subscription services including the service provided by the second mobile network operator; and
providing instructions, by the equipment of the default mobile network operator to a network element of the default mobile network operator, to prevent network access based on the default credential information by the first end user device.

15. The method of claim 14, wherein the equipment of the default mobile network operator obtains the second credential information from a database that stores credentials of the plurality of mobile network operators, and wherein the providing the instructions to the network element comprises causing the network element to remove a stored record associated with the default credential information.

16. The method of claim 15, wherein the database is shared by the plurality of mobile network operators enabling equipment of each of the plurality of mobile network operators to distribute credentials of the plurality of mobile network operators to universal integrated circuit cards of portable end user devices.

17. The method of claim 14, wherein the equipment of the default mobile network operator obtains the second credential information from the second mobile network operator, and wherein the providing the instructions to the network element comprises causing the network element to remove a stored record associated with the default credential information.

18. The method of claim 14, wherein the default mobile network operator and the second mobile network operator are independently operated entities.

19. The method of claim 14, wherein the providing of the second credential information of the second mobile network operator to the first end user device enables the first end user device to perform operations comprising:
determining that a second universal integrated circuit card of a second end user device is not provisioned with the service of the second mobile network operator; and
providing, to the second universal integrated circuit card of the second end user device, the second credential information of the second mobile network operator.

20. The method of claim 19, wherein the selection identifies a service plan for the service of the second mobile network operator that is selected from among a group of service plans, wherein the providing of the second credential information of the second mobile network operator to the second universal integrated circuit card of the second end user device enables the second universal integrated circuit card to store the second credential information in the second universal integrated circuit card and to initiate the service with equipment of the second mobile network operator according to the second credential information and the service plan.

* * * * *